United States Patent [19]
Li

[11] Patent Number: 5,364,565
[45] Date of Patent: Nov. 15, 1994

[54] ELECTROVISCOELASTIC GEL-LIKE SOLIDS

[75] Inventor: Chi Li, Orchard Lake, Mich.

[73] Assignee: Ford Motor Company, Dearborn, Mich.

[21] Appl. No.: 753,251

[22] Filed: Aug. 30, 1991

[51] Int. Cl.⁵ .................................. H01B 1/20
[52] U.S. Cl. ........................ 252/500; 252/511; 252/512; 252/518; 252/73
[58] Field of Search .............. 252/73, 74, 75, 77, 252/78.1, 78.3, 500, 518; 524/731, 745, 789, 791, 849, 860

[56] References Cited

U.S. PATENT DOCUMENTS

| | | | |
|---|---|---|---|
| 3,047,507 | 7/1962 | Winslow | 252/75 |
| 3,385,793 | 5/1968 | Klass et al. | 252/75 |
| 3,397,147 | 8/1968 | Martinek | 252/78 |
| 3,970,573 | 7/1976 | Westhaver | 252/73 |
| 3,984,339 | 10/1976 | Takeo et al. | 252/74 |
| 4,011,168 | 3/1977 | Uhlmann | 252/63.7 |
| 4,033,892 | 8/1977 | Stangroom | 252/76 |
| 4,094,150 | 6/1978 | Clarke | 524/789 |
| 4,146,673 | 3/1979 | Headley | 252/500 |
| 4,407,054 | 10/1983 | Zipfel, Jr. | 252/62.9 |
| 4,423,191 | 12/1983 | Haven et al. | 264/26 |
| 4,470,898 | 9/1984 | Penneck et al. | 252/511 |
| 4,476,155 | 10/1984 | Niemi | 427/58 |
| 4,621,029 | 11/1986 | Kawaguchi | 524/860 |
| 4,645,614 | 2/1987 | Goossens et al. | 252/75 |
| 4,702,855 | 10/1987 | Goossens et al. | 252/75 |
| 4,744,914 | 5/1988 | Filisko et al. | 252/74 |
| 4,772,407 | 9/1988 | Carlson | 252/74 |
| 4,775,778 | 10/1988 | van Konynenburg et al. | 252/511 |
| 4,812,251 | 5/1989 | Stangroom | 252/73 |
| 4,879,056 | 11/1989 | Filisko et al. | 252/74 |
| 4,900,387 | 2/1990 | Johnson | 156/272.2 |
| 5,194,181 | 3/1993 | Reitz | 252/500 |
| 5,213,713 | 5/1993 | Reitz | 252/518 |
| 5,232,639 | 8/1993 | Reitz et al. | 252/518 |

*Primary Examiner*—Paul Lieberman
*Assistant Examiner*—Necholus Ogden
*Attorney, Agent, or Firm*—Lorraine S. Melotik; Roger L. May

[57] ABSTRACT

This invention is directed to a gel-like solid whose viscoelastic properties such as shear modulus and loss factor vary when the solid is exposed to an electric field. The material comprises polarizable particles dispersed in a lightly crosslinked polymer matrix. The non-conductive polymer matrix is the reaction product of liquid prepolymer such as crosslinkable polydimethylsiloxanes and curative therefor. The polarizable particles comprise high dielectric constant material such as zeolite or silicate.

17 Claims, 1 Drawing Sheet

ELECTROVISCOELASTIC GEL-LIKE SOLIDS

BACKGROUND OF THE INVENTION

1. Technical Field

This invention is directed to a gel-like solid comprising polarizable particles dispersed in a lightly crosslinked polymer matrix.

2. Discussion of Relevant Art

It is generally known that electroviscous (EV) or electrotheological (ER) fluids exhibit pronounced reversible changes in apparent viscosity and resistance to shear in response to the application of an electric field. Such fluids generally comprise suspensions of finely divided, solid particles in an electrically non-conductive oil which can be rapidly and reversibly increased from the liquid to the plastic or solid state under the influence of a sufficiently powerful electric field. Both direct current electric fields and alternating current electric fields may be used for altering the viscosity. Such electroviscous fluids are proposed for use in shock absorbers and variable speed accessory drive clutches. Such fluids have the disadvantage, however, that the particles tend to settle and form separate phases in the fluid. The fluid nature of the ER fluids also precludes them from being used in applications such as for elastic (rubber) dampers with adjustable damping rate because they readily change their shape and flow upon the application of external forces. The ER fluids also require tight seals to prevent the fluid from leaking from their containers, e.g., an ER fluid type shock absorber.

It is an object of the present invention to provide a material which exhibits changes in its viscoelastic properties like shear modulus and loss factor (often referred to as damping factor) when subjected to an electric field. It is another object to provide such a material which is a gel-like solid so that the polarizable particles are maintained in a lightly crosslinked polymer matrix and not subject to settling. It is a further object of the invention to provide an electroviscous gel-like solid of sufficient rigidity which allows unique applications such as variable stiffness elastomers, vibration dampers, and accelerometers not available to ER fluids.

SUMMARY OF THE INVENTION

This invention is directed to an electroviscoelastic gel-like solid which includes polarizable particles substantially uniformly dispersed in a matrix of partially crosslinked, non-conductive polymers. The polarizable particles preferably have a dielectric constant greater than about 10 and a particle diameter, on average, preferably less than about 20 microns. The partially crosslinked, non-conductive polymers are the reaction product of liquid prepolymer and curative in an amount sufficient to crosslink a portion of the liquid prepolymer so as to form a lightly crosslinked polymer matrix. Preferably, the polarizable particles make up between about 30 and 80% of the gel-like solid by volume.

According to another embodiment of this invention it is directed to a method of making the electroviscoelastic gel-like solid disclosed above. According to yet another embodiment of this invention it is directed to an article made of the electroviscoelastic gel-like solid disclosed above.

Advantageously, the polarizable particles of the present invention are fixed in place in a solid polymer matrix avoiding problems associated with particle settling in an ER fluid. Additionally, the present invention material allows for applications available to a solid variable stiffness material but not an ER fluid. Still further, containment problems associated with applications utilizing ER fluids, e.g., the requirement of leakproof seals, are avoided with the present invention solid material.

DETAILED DESCRIPTION OF THE PREFERRED EMBODIMENTS

Figure 1:
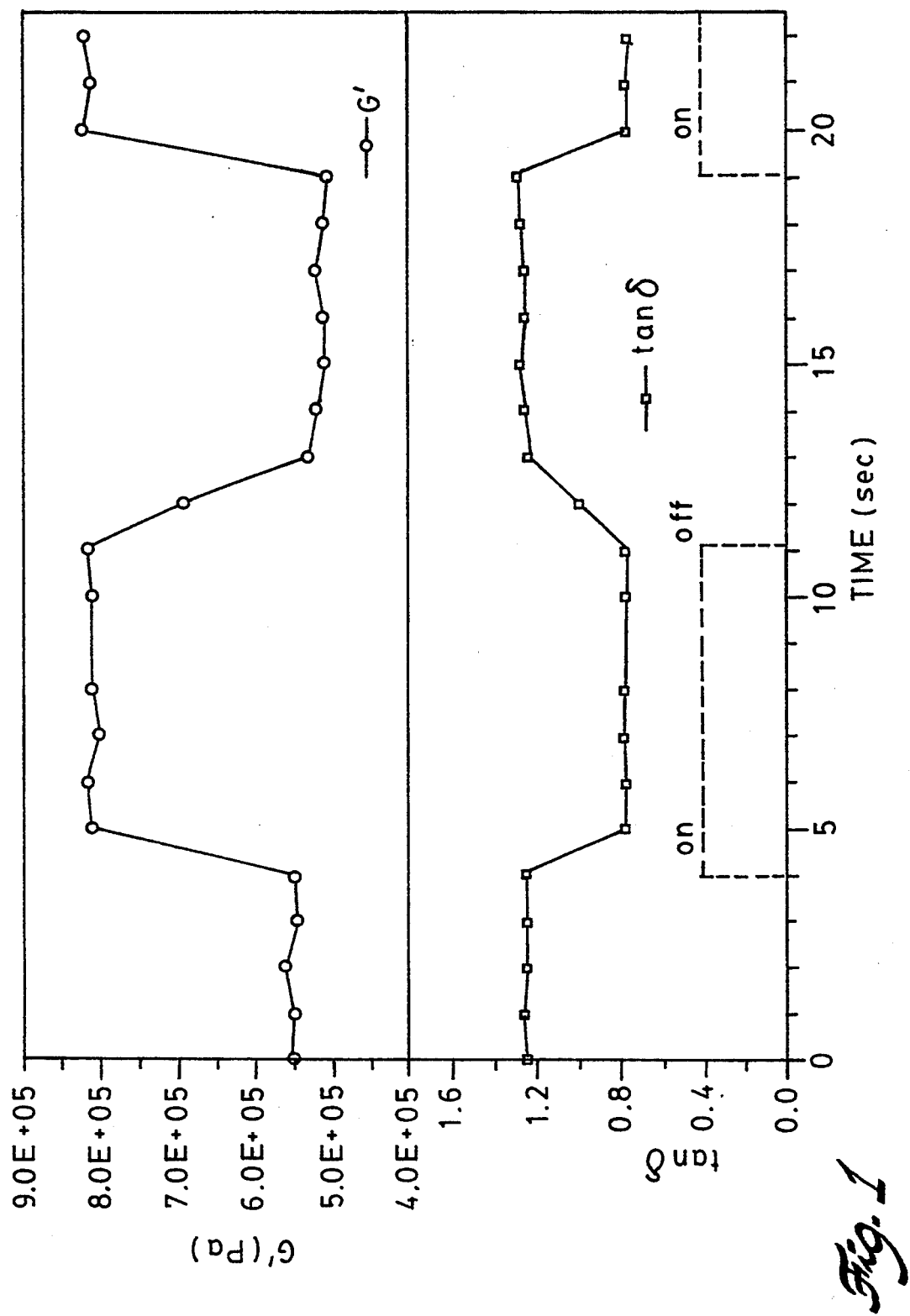
FIG. 1 is a graph showing the change of modulus (G') and loss factor (tan δ) for an electroviscoelastic gel-like solid according to an embodiment of the present invention when it is in the presence of a direct current electric field which is switched on and off.

The electroviscoelastic gel-like solid of the present invention comprises polarizable particles substantially uniformly dispersed in a lightly crosslinked, non-conductive polymer matrix. These particles preferably possess a high dielectric constant greater than about 10 so that they are highly polarizable. The particles preferably have, on average, a diameter of less than about 20 microns, more preferably between about 5 to 10 microns. The particles may be, but are not limited to, polarizable inorganic materials like zeolite, silicate, silica gel, china clay, titanium dioxide or lithium hydrazinium sulfate. They may also be polymeric materials such as polyethylene-methacrylic acid, sulfonated polystyrene, and other ion-containing polymers such as polyurethane ionomers. The particles employed in the present invention may also comprise compatible mixtures of any such materials. Still other useful materials for the polarizable particles will be apparent to those skilled in the art in view of the present disclosure. Exemplary of preferred materials are the crystalline zeolites, e.g., crystalline aluminosilicates, disclosed in U.S. Pat. No. 4,879,056 to Filisko et al which is herein expressly incorporated by reference for such teachings. Still other useful polarizable materials are those disclosed in U.S. Pat. No. 4,702,855 to Goossens et al. in Table 2 as "Dispersion Phase" materials which is similarly expressly incorporated by reference herein.

The polarizable particles are dispersed in a lightly crosslinked, non-conductive polymer matrix. The matrix phase is the reaction product of (a) liquid prepolymer and (b) curative for the prepolymer. The prepolymer liquid may be selected from, but is not limited to, reactive oligomers such as $\alpha,\omega$-hydroxylpropyl polybutadienes or crosslinkable polydimethylsiloxanes (PDMS) containing hydrogen-methyl siloxane groups and vinyl-methyl siloxane groups, and compatible mixtures of prepolymers. The curative is employed in an amount sufficient to crosslink a portion of the liquid prepolymer so as to form a lightly crosslinked, polymer matrix. Because the solid matrix material is only lightly crosslinked, it has gel-like elastic properties. As is known to those skilled in the art, a solid is a material which does not flow when subjected to an applied force. When loaded with polarizable particulate and subjected to a sufficiently strong electric field, the gel-like solid of the present invention changes its viscoelastic properties such as shear modulus and loss factor.

The curative employed to lightly crosslink the prepolymer may be any of the many known and generally commercially available materials suitable to crosslink the chosen prepolymer. For example, poly-functional isocyanate can be used to crosslink the $\alpha,\omega$-hydroxylpropyl polybutadiene and methyl hydrogen polysiloxanes can be used to crosslink PDMS containing vinyl groups. Sulfur curatives also can be used to crosslink prepolymers like polybutadiene or polyisoprene elastomers. The particles are dispersed in the electroviscoelastic gel-like solid usually in an amount between about 30 and 80% by volume. Selection of suitable liquid prepolymers and curatives therefor for use in the present invention will be apparent to those skilled in the art in view of the present disclosure.

Optional material which may be included in the electroviscoelastic gel-like solid include anti-oxidants, plasticizers, photostabilizers, and pigments. These materials are used, e.g., to improve the thermal and u.v. stability of the gel-like solid materials of the present invention.

Generally to prepare an electroviscoelastic gel-like solid according to the present invention, the liquid prepolymer and the polarizable particles would be combined to form a substantially uniform dispersion of the particles in the prepolymer. To this dispersion would be added the curative with mixing. Depending on the prepolymer and curative used, it may be desirable to heat the mixture to accelerate the crosslinking reaction. When using isocyanate curative, the crosslinking reaction takes place readily even at room temperature. In such a situation, the mixture can simply be allowed to stand after mixing during which time a gel-like solid material according to the present invention forms. The crosslinking reaction can take place either in the presence or absence of an electric field, which may be a strong electric field. An electric field is produced between two essentially parallel electrodes spaced a given number of millimeters apart. A strong electric field is considered herein to be greater than about 100 V/mm.

Test Procedures

The electric fields effect on the solid material's viscoelasticity can be examined by using a typical forced-excitation dynamic mechanical testing device. The shear modulus of a material is a measure of its stiffness (similar to the spring constant) while the loss factor reflects its ability to damp mechanical vibration by dissipation. A dynamic mechanical thermal analyzer (DMTA) from Polymer Laboratory Inc. was used to record the change of modulus and loss factor of the solid when an electric field was applied. The electroviscoelastic gel-like solids were sliced to 10mm diameter discs with 1.0 to 2.0 mm thickness. For testing, one of the flat faces of the disk was mounted to one of two parallel electrode plates of a shear testing fixture on the DMTA. The driving plate of the shear fixture was connected to the output terminal of a direct current (DC) voltage supplier capable of 1.0 to 5.0 kV output. The ground terminal of the voltage supplier was connected to the stationary plate. The DMTA device performed the testing experiment at 1.0 Hz frequency and room temperature (about 25° C.) and automatically calculated the material's modulus and loss factor.

EXAMPLE 1

In a typical procedure, 10.0g of zeolite (pore diameter 5 Angstroms, 20 μm diameter, Z3125 Sigma Chemicals, St. Louis, Mo.) was mixed with 5.0g of polydimethylsiloxane prepolymer, part A of SYLGARD 527 (tradename, Dow Corning, Midland, Mich.), and then 5.0g of curative, part B of SYLGARD 527 (tradename, Dow Corning), was mixed in to form a uniform viscous liquid mixture. It was left in a fluorocarbon coated dish for 24 hours to allow the crosslinking reaction to take place. A white, gel-like solid material was obtained. The material was then cut into samples as described above for the DMTA experiments. The value of the shear modulus increased from $4.5 \times 10^5$ Pa at 0.0 V to $7.9 \times 10^5$ Pa at 1.0 kV/mm. The loss factor decreased from 1.25 at 0.0 V to 0.91 at 1.0 kV/mm. FIG. 1 shows graphically the change of modulus and loss factor tan $\delta$ as the electric field was switched on and off. As can be seen from this figure, the elastic modulus increases and the loss factor decreases as the field is switched on at 4 seconds and at 19 seconds. The loss factor tan $\delta$ increases as the electric field was switched off at 11 seconds. The modulus decreased about 33% while the loss factor increased about 45%.

EXAMPLE 2

The procedure of Example 1 was followed except that 10.0g of zeolite (pore diameter 10 Angstroms, 10 μm diameter, Sigma Chemicals) was mixed with 7.5g polydimethylsiloxane prepolymer (part A of SYLGARD 527, tradename, Dow Corning) and 2.5g of curative (part B of SYLGARD 527, tradename, Dow Corning). The mixture was then allowed to crosslink as in Example 1 and cut into disk samples for testing. The value of the shear modulus increased from $1.4 \times 10^5$ Pa at 0.0 V to $7.2 \times 10^5$ Pa at 1.0 kV/mm. The loss factor decreased from 1.4 at 0.0 V to 0.79 at 1.0 kV/mm.

EXAMPLE 3

In this example according to an embodiment of the present invention, the mixture of zeolite, prepolymer and curative was crosslinked in the presence of an electric field (1000V/1.3mm). Zeolite (EZA Zeolite A, Ethyl Chemical Corp., Baton Rouge, La.) in an amount of 10.0g was mixed with 5.0g of the prepolymer and 5.0g of the curative described in Example 1. A portion of the paste-like mixture was then placed (spread) between the driving plate and the stationary plate in the DMTA. The plates were separated by 1.0 mm. A 1.5 kV DC electric field was applied and a heat gun was used to heat the paste-like mixture slightly (about 5 minutes) to accelerate the crosslinking reaction. Once the mixture became a gel-like solid, the DMTA testing was conducted. The value of the shear modulus increased from $5.5 \times 10^5$ Pa at 0.0 V to $8.1 \times 10^5$ Pa at 1.0 kV/mm. The loss factor decreased from 1.9 at 0.0 V to 0.72 at 1.0 kV/mm. The gel-like solid crosslinked in the electric field in this example appeared to have a higher shear modulus than those prepared in Example 1 in the absence of an electric field.

While the invention has been described with reference to specific examples and application, modification such as other types of prepolymers, curatives, polarizable particles as well as electric fields and uses for the invention will be apparent to those skilled in the art without departing from the spirit and scope defined in the appended claims.

I claim:

1. An electroviscoelastic solid comprising: electrically polarizable particles substantially uniformly dispersed in a partially crosslinked non-conductive polymer matrix which is the reaction product of (a) liquid prepolymer being a reactive oligomer selected from the group consisting of $\alpha$, $\omega$-hydroxylpropyl polybutadiene and crosslinkable polydimethylsiloxanes and (b) curative in an amount sufficient to crosslink a portion of said liquid prepolymer, said solid being capable of undergoing at least about 10% repeated reversible changes in shear modulus and damping factor in a variable electric field.

2. The electroviscoelastic solid according to claim 1 wherein said polarizable particles comprise a material selected from the group consisting of: (i) polarizable inorganic compositions and (ii) polarizable polymers.

3. The electroviscoelastic solid according to claim 2 wherein said inorganic compositions are selected from the group consisting of: zeolite, silicate, silica gel, china clay, titanium dioxide, and lithium hydrazinium sulfate.

4. The electroviscoelastic solid according to claim 2 wherein said polarizable polymers are selected from the group consisting of: polyethylene-methacrylic acid, sulfonated polystyrene, and polyurethane polymers.

5. The electroviscoelastic solid according to claim 1 wherein said polarizable particles have an average particle diameter less than about 20 microns.

6. The electroviscoelastic solid according to claim 5 wherein said particle diameter is, on average, between about 5 and 10 microns.

7. The electroviscoelastic solid according to claim 1 wherein said polarizable particles make up between about 30 and 80% of said gel-like solid by volume.

8. The electroviscoelastic solid according to claim 1 wherein said polarizable particles have a dielectric constant greater than about 10.

9. An article made of an electroviscoelastic solid according to claim 1, whose shear modulus is subject to change in the presence of an electric field.

10. A method of reversibly changing the shear modulus and damping factor of an electroviscoelastic solid, said method consisting essentially of:

Placing an electroviscoelastic solid comprising electrically polarizable particles substantially uniformly dispersed in a partially crosslinked non-conductive polymer matrix in an electric field, said matrix being the reaction product of (a) liquid prepolymer being a reactive oligomer selected from the group consisting of $\alpha, \omega$-hydroxylpropyl polybutadiene and crosslinkable polydimethylsiloxanes and (b) curative in an amount sufficient to crosslink a portion of said liquid prepolymer; and subjecting said solid to a reversing electric field, which method results in repeated reversible changes of at least about 10% in said shear modulus and damping factor of said solid.

11. The method according to claim 10 wherein said polarizable particles comprise a material selected from the group consisting of: (1) polarizable inorganic compositions and (ii) polarizable polymers.

12. The method according to claim 11 wherein said inorganic compositions are selected from the group consisting of zeolite, silicate, silica gel, china clay, titanium dioxide, and lithium hydrazinium sulfate.

13. The method according to claim 11 wherein said polarizable polymers are selected from the group consisting of polyethylene-methacrylic acid, sulfonated polystyrene, and polyurethane ionomers.

14. The method according to claim 10 wherein said polarizable particles have an average particle diameter less than about 20 microns.

15. The method according to claim 14 wherein said particle diameter is, on average, between about 5 and 10 microns.

16. The method according to claim 10 wherein said polarizable particles make up between about 30 and 80% of said solid by volume.

17. The method according claim 10 wherein said polarizable particles have a dielectric constant greater than about 10.

* * * * *